Aug. 18, 1925.
W. E. LASSITER
1,550,371
MUD GUARD RETAINER
Filed March 13, 1925
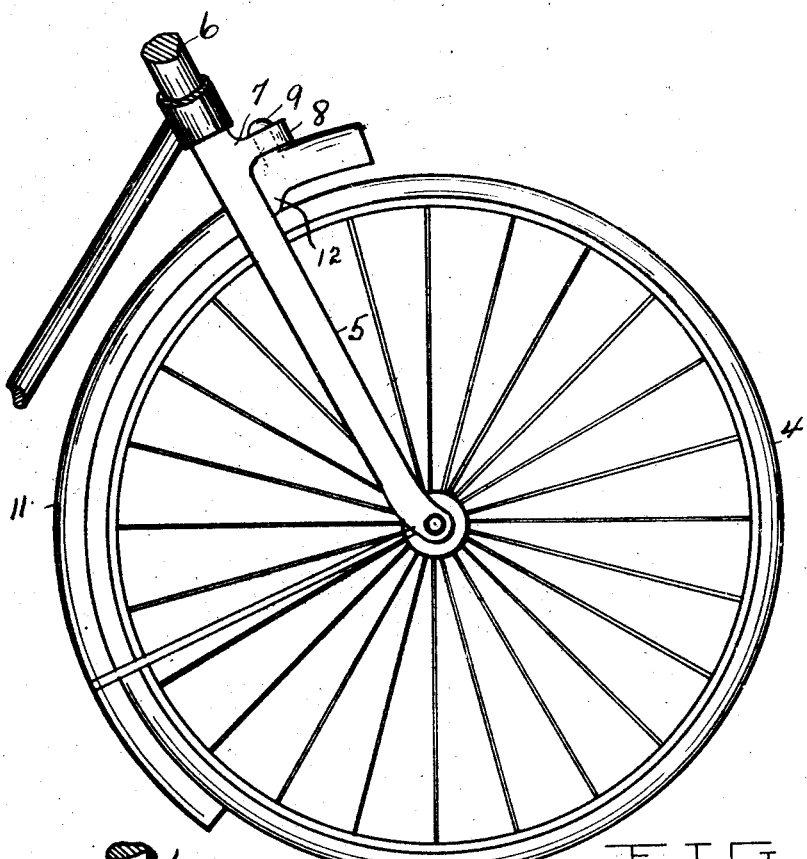
FIG 1
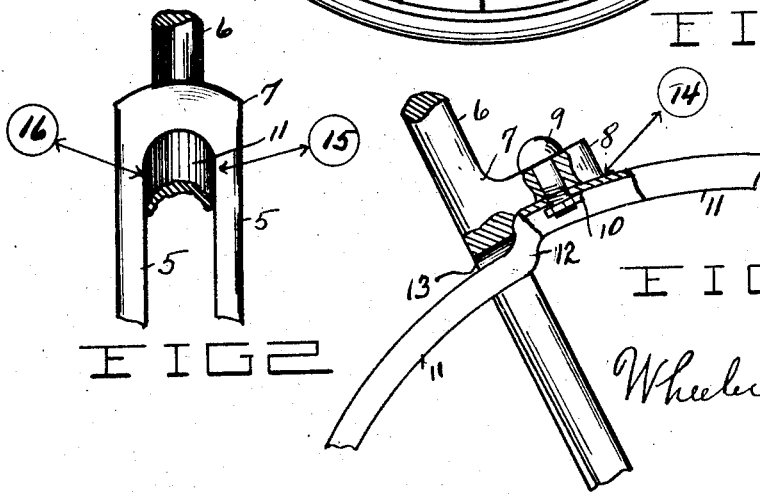
FIG 2
FIG 3
INVENTOR.
Wheeler E. Lassiter Patented Aug. 18, 1925.

1,550,371

UNITED STATES PATENT OFFICE.

WHEELER E. LASSITER, OF OKLAHOMA CITY, OKLAHOMA.

MUD-GUARD RETAINER.

Application filed March 13, 1925. Serial No. 15,213.

*To all whom it may concern:*

Be it known that I, WHEELER E. LASSITER, a citizen of the United States, residing at Oklahoma City, in the county of Oklahoma and State of Oklahoma, have invented a certain new and useful Invention in Mud-Guard Retainers, of which the following is a specification, reference being had to the accompanying drawings.

This invention relates to means for securing mud guards to bicycles.

It is an object of the invention to keep the guard, which, ordinarily is an elongated element, from movement sidewise—or, in other words, more generally, to keep the guard from wabbling.

On the drawing, accompanying and forming a part of the specification,—

Figure 1 is a side elevational view of wheel, fork, segment of the head, and the invention applied.

Figure 2 is a detail in front view.

Figure 3 is a detail in side view and sectioned at points to show construction.

In the views similar characters of reference indicate similar parts.

The wheel 4, forks 5, and head stock 6 constitute no important part of the invention, until at the lower part of the head at 7, a lip or lug 8 is cast integrally with the head 7, extending outwardly and containing an opening through which a bolt 9 passes to receive a nut 10 after the mud guard 11 has been set in place. This guard 11 is not a continuous aligned member as to arc corresponding to the contour of the rim of the wheel, but at the intersection 12, where the guard passes under and through the head 7 and forks 5, is offset to clear the base 13 of the head 7. When the insertion of the guard has been made, and the same has been properly set in place, then the bolt 10 aforementioned is set in place, and the guard fixed. When this is accomplished, it will be noted that the guard 11 not only has a positive bearing at 14 for some considerable area, but at the same time also has two positive bearings at 15 and 16, thus keeping the guard 11 from any sidewise movement, or, as previously stated, from wabbling.

Having thus set forth the invention, I claim:

1. A mud guard and its retainer, consisting of a guard arched but offset, and passing through the forks of a bicycle, a bicycle head and forks, and an integrally formed lip on said head and to which the guard is secured.

2. A bicycle head, a lip proceeding therefrom, forks depending from the head, a wheel, a mud guard offset in its curved length and retained beneath the head and between the forks, and a bolt passing through the lip for receiving a nut to retain said guard.

3. A bicycle having head and fork, a mud guard offset in its curved length and passing between the said forks, a lip on the head, and a bolt passing through the lip for holding the guard remote from the head and against both inner sides of the said forks.

4. A bicycle head having an integral lip having an opening, forks proceeding from the head, a mud guard offset intermediate of its length, and seated at the offset under the head, a bolt for retaining the guard and lip in fixed relation, while the sides of the guard impinge the insides of the forks.

In testimony whereof I have signed my name, this 6th day of March, in the year of our Lord, nineteen hundred and twenty-five.

WHEELER E. LASSITER.